United States Patent [19]
Bourque

[11] Patent Number: 5,749,788
[45] Date of Patent: May 12, 1998

[54] TUNABLE JOINT FOR A POOL CUE HAVING COMPRESSIVE INSERTS

[76] Inventor: Daniel R. Bourque, 5 Brompton St., Sanford, Me. 04074

[21] Appl. No.: 764,144

[22] Filed: Dec. 12, 1996

[51] Int. Cl.⁶ .................................................. A63F 15/08
[52] U.S. Cl. .................................................. 473/44; 403/292
[58] Field of Search .................................. 403/292, 293, 403/296; 473/44–49

[56] References Cited

U.S. PATENT DOCUMENTS

| | | | |
|---|---|---|---|
| 970,172 | 9/1910 | Bloom et al. | 473/44 |
| 1,147,705 | 7/1915 | Campbell | 473/44 |
| 3,269,730 | 8/1966 | Miller et al. | 473/44 |
| 3,334,901 | 8/1967 | Steffes | 473/44 |
| 3,368,271 | 2/1968 | Scheffler | 473/44 |

FOREIGN PATENT DOCUMENTS 2192800  1/1988  United Kingdom ............... 473/44

Primary Examiner—Mark S. Graham

[57] ABSTRACT

A threadable joint in a tunable cue for joining together butt and shaft sectional pieces. Threaded joint sections include a cylindrical bore, extending longitudinally through the entire length of the joint, for receiving a multiplicity of inserts. Such inserts fit within the bore and provide for a wood-to-wood continuum in the heart of the cue. Several inserts selected from different wood types and compressibility amounts within the assembled cue provide for user customization.

14 Claims, 3 Drawing Sheets

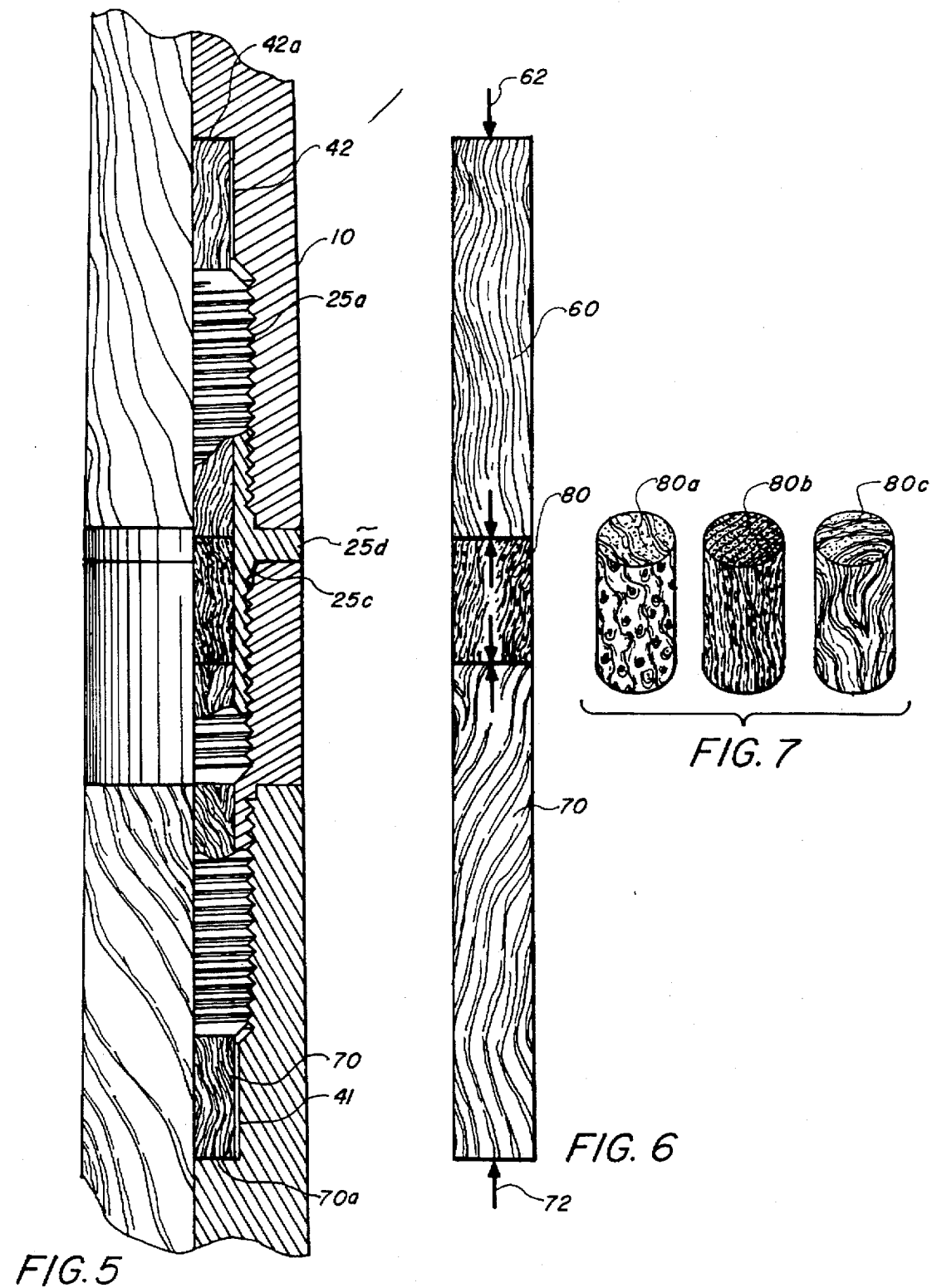

TUNABLE JOINT FOR A POOL CUE HAVING COMPRESSIVE INSERTS

BACKGROUND OF THE INVENTION

1. Field of the Invention

The field of the invention relates to a method and apparatus for "breaking down" a pool cue and reassembling same by use of a joint that provides a personally customized wood "feel" or cue response when the re-assembled cue is in use. In a more limited sense, the field of the invention relates to a threadable joint for joining together shorter butt and shaft sectional pieces of a pool cue for ease of storage, transportability and the like.

Furthermore, the field of the invention includes, as an option, a series of tunable wood inserts for the cue joint, which inserts may be located longitudinally in an oversized central bore running through the metal joint. A user may thus choose different ones of the series of wooden inserts which are advantageously selected of differing wood types such as black walnut, cherry, mahogany and the like. These inserts may then be shortened as desired for an individual user in order to vary the compressibility of the insert when the cue is assembled. The method and apparatus of this invention thus provides a way for a user to vary the "feel" of the cue during use.

2. Definition of Terms

Storable Configuration.

The storable configuration for a pool cue refers to the provision in a pool cue of one or more joints that firmly connect the pool cue sections together for use. Such joints also allow a user to break down a pool cue for ease of storage and transportation, and then re-assemble/re-join the cue for use in playing pool.

Pool Cue Joint.

A threadable metal or perhaps hard plastic joint for selectively joining together one or more butt and shaft sectional pieces of a pool cue.

Joint Bore.

The joints of this invention include an oversized longitudinal bore therethrough, which bore is separable at the breakdown point for a cue. Wooden insert pieces are seated in the bore, and by end-to-end contact such wooden inserts provide a complete wooden heart throughout the length of the sectioned cue.

Wooden Inserts.

Wood inserts provide a varied, adjustable and continuous wooden heart for the length of the pool cue. That "heart" may consist of several different types of wood inserts which are seated in joint bores and are located longitudinally therein. Such wooden inserts extend through each section-joining joint and the center insert allows the joint to be separated and re-assembled as desired.

Customized Tunable Wooden Insert.

Each joint has three separate longitudinal wooden insert sections, two fixed and one removable. The centermost insert is removable at will and may be shortened as desired for an individual user. Such shortening varies the compressibility of the centermost wooden insert when the threaded cue joint halves are tightened together for pool cue use in playing pool.

Customized Tuning of Insert(s).

The removable insert(s) may be custom-adjusted in length or wood type at the desire of the user. Different wood types are available for additional variation in "tunability" of the cue. For example, a user may select a particular type of wooden insert from the series of wood types such as black walnut, cherry, mahogany and the like. Different types/lengths of wood supply a different feel and/or response based upon a variable amount of cue/insert wood-to-wood contact for the player when the customized cue is in use.

DESCRIPTION OF PRIOR ART

The sport of pool is an age-old one in which many different cue weights, lengths, tips and cue types have been provided. With today's ease of travel and desirability of assembly/disassembly of pool cues, a sophisticated need has developed for a truly professional feeling and confidence in a sectional pool cue.

Most serious pool players strongly resist today's sectioned pool cues because they do not provide the right feel, sound or cue-tip contact when joints are affixed to two or more cue sections making up the assembled pool cue. Pool cue striking of the cue ball is paramount to a good pool game. As with any sport, confidence and familiarity with the equipment advances the user's enjoyment and success.

While cue assembly and/or dis-assembly provides considerable advantages in storage and transportability, the sport has developed to the point that serious players simply will not tolerate unusual feels or sounds during pool matches. Moreover, professional players demand one or more pool cues for breaking and playing, and each such cue has its own comfortable feel for the player.

Sectional pool cue joints of today include threaded joint halves that almost universally yield a metal to wood or metal to metal contact through the joint structure itself. Such unusual metal/wood or metal/metal contact dramatically alters the "feel" of the cue and is not acceptable to many players.

Moreover, many of today's sophisticated pool players have developed to the point that each one feels his cue is the solution to advancement and pleasure in the game. However, no known cue joint provides both a wooden feel throughout and yet can supply a variability in the type and/or compressibility of cue "feel".

With the joint structure of this cue invention, a user is afforded variability in both wood type and compressibility in the length of the cue shaft itself. Additionally each user may tune his own cue to the desired parameters that best fit his/her game and can rely on the enduring presence of those parameters in his own sectioned pool cue.

In short, what has heretofore been a serious disadvantage in sectioned pool cues—separable cue joints—has been turned into a beneficial advantage and personalized feature that was not heretofore known in the art.

SUMMARY OF THE INVENTION

A threadable joint for joining together butt and a shaft sectional pieces of a pool cue, with the joint having a cylindrical, hollow joint section of hard material that includes two threadable halves adapted to treadably mate together when said halves are each affixed at opposed ends of two sections of a pool cue to be joined together by said joint. A cylindrical bore, extending longitudinally through both of said joint halves, receives a pair of wooden inserts, one each for each joint halve. Each wooden insert is adapted to fit within said bore and both end inserts have a protrusion extending beyond the opposite ends of said joint halves for a wood-to-wood bonding of the joint halves to said pool cue sections.

A third wooden insert is also adapted to fit within said bore and it completes a wood-to-wood continuum through said joint when said third insert is compressively fit end-to-end with the other two inserts within said threaded joint.

Additionally, as an option, a series of tunable wood inserts for the cue joint are provided. Such inserts may be customized before being placed longitudinally in the oversized bore. A user may select different ones of a series of center inserts, which inserts are advantageously of differing wood types such as black walnut, cherry, mahogany and the like. These inserts may also be shortened as desired for an individual user in order to vary the compressibility of the insert when the cue is assembled. The individual joint halves are each tapered at the ends and are matingly bevelled at the joining flange in order to come together with a precise fit that allows the compression to remain constant once adjusted for an individual user.

Accordingly, the method and apparatus of this invention thus provides a way for a user to vary the "feel" of the cue during use, and yet separate the cue sections for ease of transportability and storage.

OBJECTS OF THE INVENTION

It is an object of the invention to provide a customized and tunable joint for a pool cue.

It is an object of the invention to provide wooden insert sections that span a cue joint.

It is an object of the invention to supply a removable wooden insert spanning a threaded joint for a pool cue.

It is an object of the invention to provide several different wood types for a removable insert from a multiplicity of wooden inserts in order to supply several variations in the "feel" of a cue when in use.

It is an object of the invention to provide three wooden inserts seated in a central bore located longitudinally in a threaded metal joint for a pool cue.

It is an object of the invention to provide a method of customizing the compressibility of a selected wooden insert for a pool cue joint.

It is an object of the invention to provide a pool cue joint which is functional with several different types of wooden inserts.

It is an object of the invention to provide a variation in compressibility of a wooden longitudinal heart of a pool cue by shortening a selected wooden insert to a customized length.

BRIEF DESCRIPTION OF DRAWING

FIG. 5 is a partial cross-sectional view of the joint and inserts nested in a pool cue and showing my invention;s FIG. 6 is a diagrammatic way of showing the compressibility of the center removable insert; and FIG. 7 is a partial perspective of some different wood types for the customized nature of the joint of my invention.

DESCRIPTION OF PREFERRED EMBODIMENT(S)

Figure 1:
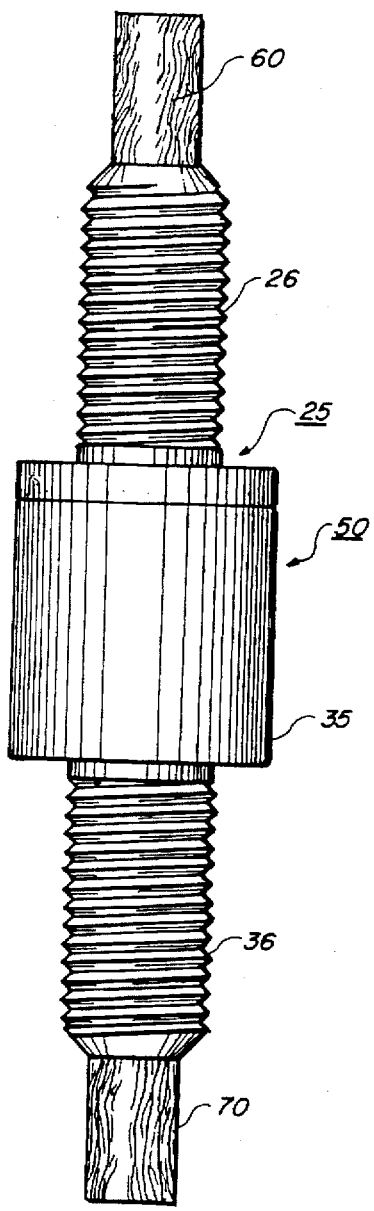
FIG. 1 is a top plan view of my new tunable joint for a pool cue.
Figure 2:
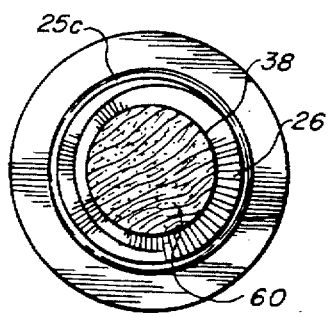
FIG. 2 is an end view of FIG. 1, with the other end view being the same.
Figure 4:
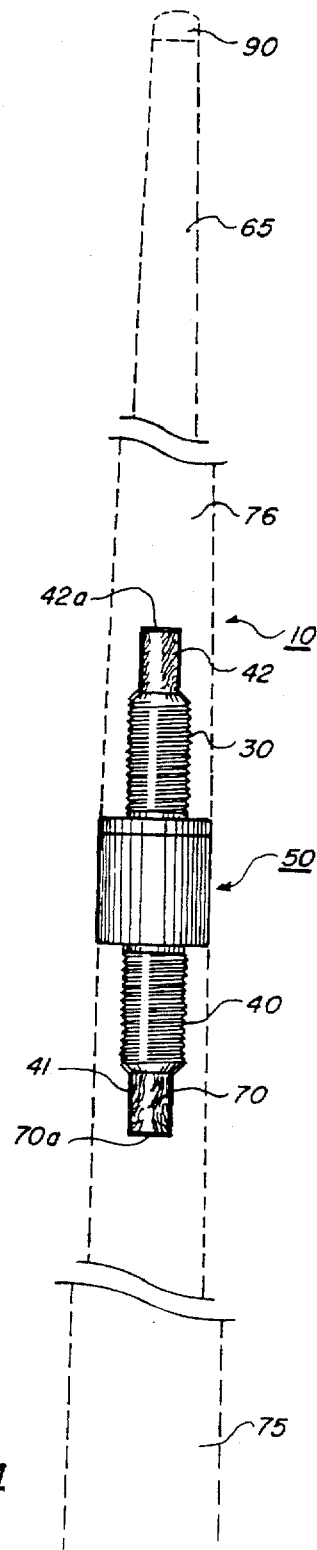
FIG. 4 is a top plan view of my new cue joint of FIG. 1 as shown within a pool cue.
Figure 3:
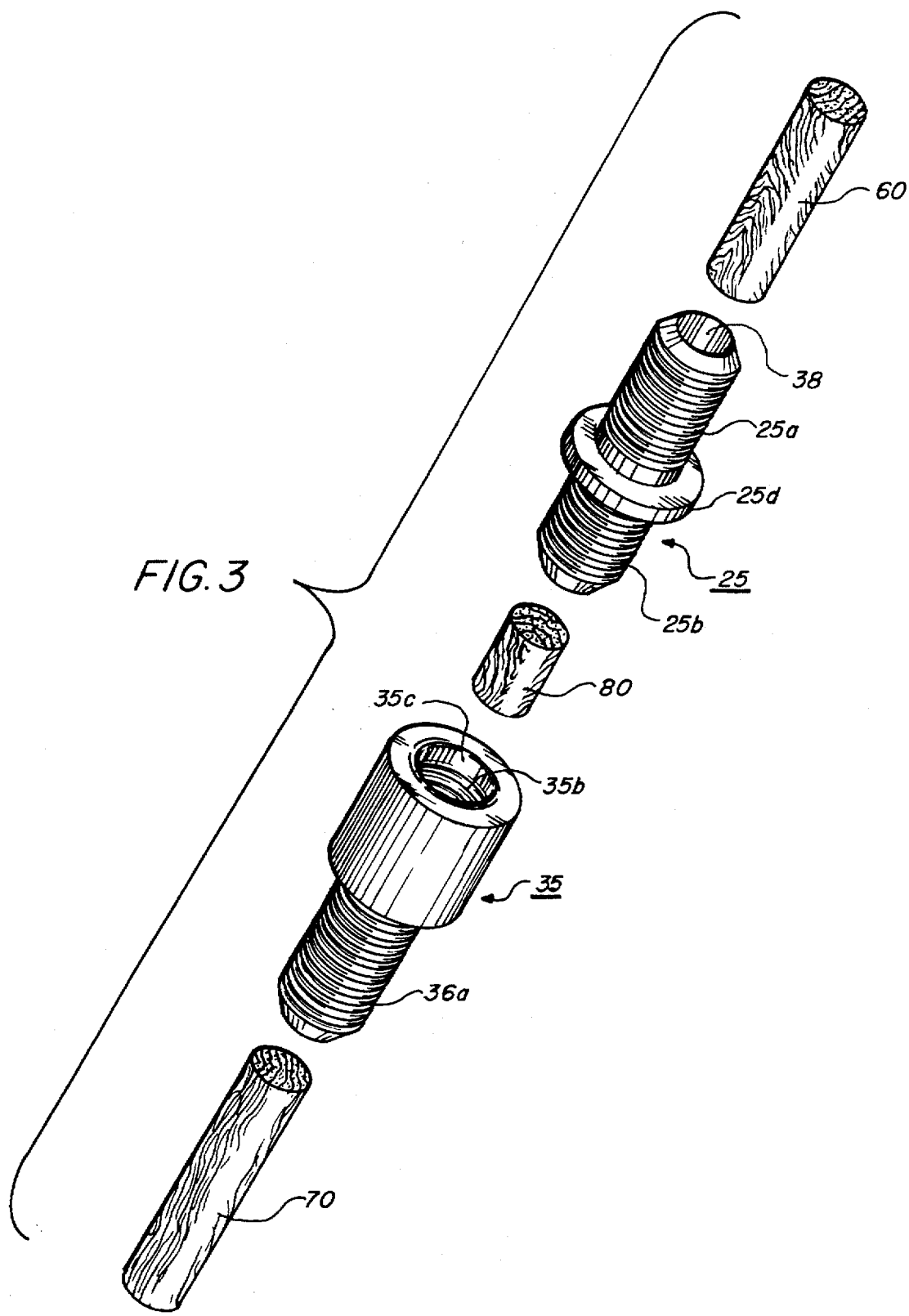
FIG. 3 is an exploded side elevation view of the joint shown in FIG. 1.

FIGS. 1, 2, 3, and 4 respectively present views which will lead to a full and complete understanding of the basic principles of this, my invention. Turning first to FIG. 1, a cue joint 50 in a threaded condition is shown as including a double-sided male threaded end 25 that has been joined with a single side female socket 35. FIG. 3 shows, in exploded form, the reason why male section 25 is referred to as double-sided while section 35 is a single sided female section 35. FIG. 4 shows a dashed cue 10 having a tip 90 and a cushion 91.

For ease of assembly each joint section 25 and 35 may be made of stainless steel metal stock or various hard plastic substitutes that will hold a set of threads 26, 36. Such threads readily allow the joint sections 25, 35 to be set into appropriate mating threaded recesses 30 and 40 in a pool cue 10, FIGS. 4 and 5. Each joint section has a longer threaded extension 25a, 36a on the joint end which is seated in the cue butt and shaft, respectively. Likewise each joint has a shorter threaded section 25b and 36b which are the metal to metal threads that assemble the joint. Threaded section 25b has a tapered bevel 25c, FIGS. 2 and 5, at the point where the flanged collar 25d seats into a mating bevel 35c located at the inlet end of the female joint halve 35.

Coaxially aligned through both joint halves 25, 35 is a longitudinal oversized bore 38, which as shown in several figures slidably receives a series of wooden inserts 60, 70 and 80. Insert 70, located in the butt section 75 of FIG. 4, receives several steps in production. For example, the bore 41, FIG. 5, is drilled to size in order to receive a given insert diameter. As a typical non-limiting example, the drill size may be ³³⁄₆₄". And then that drilled hole is flat tapped at the bottom such that a correspondingly flat-tipped end 70a of insert 70 will seat wood-to-wood with the flat end wall of the butt bore 41. The tap size may be ⁹⁄₁₆–18 for example.

Insert 70 in the butt section 75 may be pressure fit at about 0.001 into tapped bore 41. Glue is applied to insert 70 along only the peripheral cylindrical surface of insert 70. By not applying glue to the bottom walls of bore 41 or insert end 70a, the flat-tipped end seats, at the bottom of bore 41, with a wood-to-wood contact between the cue butt section 75 and the bottom insert 70.

In a similar manner the shaft, or tip end 65 is also drilled, and flat end-tapped at bore 42 with a flat bottom surface 42a, FIGS. 4 and 5. In one preferred embodiment, my wooden insert 60 need not be glued at the cylindrical side surface to shaft end 65 since insert 60 will ultimately be securely held in place with my desired wood-to-wood contact by the compressibility of insert 60 with the center wooden insert 80 when the cue 10 is in an assembled condition.

FIGS. 5 and 6 show, in a highly diagrammatic manner, the compressibility of such insert when the cue 10 is assembled for play. Arrows 62 and 72 along the longitudinal center of the inserts (and, likewise the cue, of course) depict the pressure that is applied as the joint 50 is assembled. Greater compression is afforded when the center section insert 80 is of a longer length and/or the type of wood is more dense. Greater compression at assembly of course gives a more taut cue during playing. That amount of tautness varies from player to player.

Center section 80 is selected from different types of wood that the user may desire or that a cue master may have in stock. Each type of wood—mahogany, cherry, birds eye maple, teak and the like—have a different density. Additionally, the inserts may be selected from different materials than wood and/or wooden inserts may be soaked in various solutions. These and other alternatives may well be in the nature of trade secrets owned by some cue masters. Such solutions and/or substitute materials further alter the natural differences offered by differing wood types as found in a natural state. In my own experience, however, I have found satisfactory response from my tunable cue just by employing different types of wood shaved to my selected length.

Three such center sections 80A, 80B, and 80C of different wood types are shown in FIG. 7. Each type provides, according to the combination of the density and tailored length, a different response in the assembled cue. A series of such inserts slightly over-length in dimension are shipped with each cue. The amount of compression is adjusted by varying the length of the center inserts 80A, 80B or 80C. The owner of the cue, by shortening the center section 80, may customize his own cue according to the particular cue response being sought.

Assume, for example, that a selected one of the inserts, 80B, is teak wood. That wood is not only quite dense but it is quite rigid. A cue master, or the owner, will shave or flat plane away the insert length by sanding, filing or the like. A series of such flat sanding may be required to adjust the cue response to just that feel or response as desired by any given individual. Once a small amount has been removed from an insert 80B and it is in the compression chain inside the cue as shown by FIG. 6, the arrows show how the shaft and butt ends will force the insert sections together with compressibility or compressed tension in each centermost insert.

Individualized tunability has thus been achieved for the customization of my tunable cue invention. It is to be expected that each cue master may develop his own set of trade secrets. Thus by a judicious selection of wood types for the two removable sections 60 and 80 and by impregnating such sections with various types of hardeners or solutions such as liquid resins a vast number of variations in cue individuality may be achieved.

By careful machining of the joint sections—and appropriate sizing of the joint and cue diameters—the joint 50 will not even be felt during use of the cue. A user, however, will clearly know that joint 50 of my invention has been the source of adjustability for the player's desired cue response. As an additional factor of merit, the compressibility of the insert sections holds the joined cue firmly together and thus the cue will not rattle nor tend to separate once assembled. A quick twist will release the insert compression and the cue may readily be broken down for transport or storage as desired.

While my invention has been described with reference to a particular example of preferred embodiments, it is my intention to cover all modifications and equivalents within the scope of the following claims. It is therefore requested that the following claims, which define my invention, be given a liberal interpretation which is within the spirit and scope of my contribution to this art.

What is claimed is:

1. A threadable joint of hard material for joining together a butt and a shaft section of a wooden pool cue, said joint comprising:
   a first and second flanged joint having two separable halves threaded respectively for connection together at one end and adapted at the other end for connection respectively into separate butt and shaft cue sections;
   a cylindrical bore, extending longitudinally through the joint;
   a pair of wooden inserts seated in said joint bore for contact at a seated end with the cue wood of the butt and shaft sections respectively; and
   a third center wooden insert spanning the flanged section of said joint for compressibly fitting within said bore and adopted to provide a wood-to-wood continuum for said cue.

2. A threadable joint in accordance with claim 1 wherein said wooden inserts further comprise:
   means adapted for securing the butt cue section with a wood-to-wood contact at a flat end with a mating flat end of one of said pair of wooden inserts.

3. A threadable joint in accordance with claim 1 wherein said wooden inserts are cylindrical in shape and further comprise:
   a first insert seated in said bore and having an end protruding beyond the end of the joint half set in the butt section; and
   means adapted for securing the protruding cylindrical surface to a mating cylindrical surface inside a corresponding hole in the butt section.

4. A threadable joint in accordance with claim 1 wherein said wooden inserts are cylindrical in shape and provide for user customization of cue tautness, said inserts being selected from different wood types and densities; and
   each insert of said series have a length selected to allow compressibility within the assembled cue.

5. A threadable joint in accordance with claim 1 wherein said wooden inserts provide for user customization of the cue tautness and further comprise:
   said center insert being variable in length in order to vary the amount of compressibility and thus the tautness of said cue in accordance with the particular cue response sought by the user.

6. A threadable joint in accordance with claim 1 and further comprising:
   said joint being formed from stainless steel stock and a having double-sided male ends on one joint half and male and female threaded ends on the other joint halve; and
   mating male and female bevel surfaces at the male and female sections which are to be threaded together during assembly.

7. A threadable joint for joining together butt and a shaft sectional pieces of a pool cue, with the joint comprising:
   a cylindrical, hollow joint section of hard material that comprises two threadable joint halves with male and female ends respectively that are adapted to treadably mate together when said halves are each affixed at opposed ends of two sections of a pool cue to be joined together by said joint;
   a cylindrical bore extending longitudinally through both of said joint halves;
   insert means adapted to fit within said bore adapted for compressively bonding said pool cue sections together when the joint is threadably mated together; and
   said insert means comprising a material selected for a customized continuum across said mated joint and along the length of a cue.

8. A threadable joint in accordance with claim 7 wherein said insert means provide for user customization of the cue tautness and said joint further comprises:
   a multiplicity of inserts, one each adapted to seat in bores located in said shaft and butt sections and one thereof being a removable center insert; and
   flat tips on said inserts allowing them to be seated end to end in said assembled joint.

9. A threadable joint in accordance with claim 8 wherein said center removable insert provides for user customization of the cue tautness, and said joint further comprises:
   said center insert being variable in length in order to vary the amount of compressibility and thus the tautness of said cue in accordance with the particular cue response sought by the user.

10. A method for joining together butt and a shaft sectional pieces of a pool cue, with said method comprising the steps of:

forming a cylindrically bored hollow joint section of hard material that comprises two joint halves with mating male and female threaded ends respectively;

affixing said joint halves at opposed ends of two sections of a pool cue to be joined together by such joint; and fitting within said bore a multiplicity of inserts for compressively binding said pool cue sections together when the joint halves have been threadably mated.

11. A method in accordance with claim 10 wherein said wooden inserts are cylindrical in shape and provide for user customization of cue tautness, and said fitting step further comprises:

selecting the inserts from a variety of different wood types and densities to suit an individual user; and custom adjusting the length of each selected insert of said series in order to vary the compressibility of said inserts within an assembled cue.

12. A method in accordance with claim 10 wherein said third removable insert provides for user customization of the cue tautness, and said method further comprises:

varying the length of said third insert in order to vary the amount of compressibility and thus the tautness of said cue; and selecting the material for said third insert from a variety of materials having different densities; and varying the cue response in accordance with the particular tautness sought by an individual user.

13. A method in accordance with claim 12 wherein said third removable insert is selected from natural wood types and said cue is wooden, said method providing for user customization of the cue tautness, and further comprises:

varying length of the third wooden insert cylinder by sanding, shaving, planing; and flattening the ends of bores in the cue section and in the inserts for a wood-to-wood continuum across said mated joint and along the entire length of said wooden cue.

14. A method in accordance with claim 13 wherein said method further comprises:

longitudinally boring a blind bore in the butt and shaft sections of a cue to be joined together by said joint;

flattening the bottom of said blind bores;

flattening the tips of said inserts; and inserting such flat-tipped inserts in tandem contact with one another to form said end-to-end continuum within said cue.

* * * * *